United States Patent Office 3,849,360
Patented Nov. 19, 1974

3,849,360
POLYUREA-URETHANES PRODUCED FROM A MIXTURE OF TWO POLYAMINES
Basil S. Farah, Elma, and Herbert M. Schroeder, Williamsville, N.Y., assignors to Textron Inc.
No Drawing. Filed Sept. 3, 1970, Ser. No. 69,475
Int. Cl. C08g 22/18
U.S. Cl. 260—33.2 R          21 Claims

ABSTRACT OF THE DISCLOSURE

Polyurea-urethanes are made by reaction of an isocyanate-terminated polyurethane prepolymer formed from 4,4'-bis(isocyanatocyclohexyl)methane and polyester polyol, with a diamine component containing 4,4'-bis-(aminocyclohexy)methane and one or more diamines having a single alicyclic ring, e.g. 1,4-bis(aminomethyl) cyclohexane. Solvent solutions of the products are storage stable even in solvents having a substantial amount of alkoxyalkanol, e.g. methyl Cellosolve. The polyurea-urethanes can be used to make films and other articles having desirable characteristics.

---

This invention relates to polyurea-urethane compositions made by reacting an isocyanate-terminated prepolymer of 4,4'-bis(isocyanatocyclohexyl)methane and polyester polyol with a plurality of diamines which include 4,4'-bis(aminocyclohexyl)methane and at least one diamine hydrocarbon having a single alicyclic ring. These polyurea-urethane products exhibit good storage stability even when dissolved in relatively inexpensive solvents containing a substantial portion of lower alkoxyethanol and having sufficient volatility to make the compositions readily workable into shape or formed articles, for instance, coatings or unsupported films. Such formed products have attractive properties including good resistance to solvents, durability and color retention, that is, low discoloration tendencies when exposed to ultraviolet light.

Polyurea-urethane films, for example, coatings supported on a solid substrate or independent, unsupported films, made from prepolymers of aliphatic or alicyclic diisocyanates are advantageous in view of the fact that the films are resistant to discoloration or yellowing when subjected to ultraviolet light and can exhibit other outstanding properties. One alicyclic diisocyanate commercially available is 4,4'-bis(isocyanatocyclohexyl)methane, but polyurea-urethanes made from this material have generally shown marked insolubility characteristics in solvents other than highly polar, strong solvents such as dimethylformamide, dimethyl sulfoxide and N-methyl pyrrolidone. These strong solvents aside from being relatively expensive, have rather low evaporation rates which makes their use unattractive in commercial operations. Also, these highly polar solvents are often deleterious to surfaces which contact the film, yet the use of solvent solutions of the polyurea-urethanes is virtually essential in order to make the compositions more workable and readily formed into the desired films or other articles.

The high insolvency characteristics exhibited by polyurea-urethanes made from 4,4'-bis(isocyanatocyclohexyl) methane (hereinafter referred to as $H_{12}MDI$) are frequently present when the diamine component employed to form the polyurea-urethanes is cycloaliphatic. On the other hand the use of such diamines is desirable since products made therefrom have good resistance to discoloration by ultraviolet light as well as other attractive properties. One such diamine which is commercially available and whose use is quite desirable in forming polyurea-urethanes, especially from $H_{12}MDI$-derived prepolymers, is 4,4'-bis(aminocyclohexyl)methane (hereinafter referred to as $H_{12}MDA$). Polyurea-urethanes have been made in the past using the $H_{12}MDI$—$H_{12}MDA$ combination, but generally the products have not exhibited sufficient solubility in solvents of satisfactory cost and evaporation rate to permit storage of the solvent solutions for sufficient periods to assure their more or less unrestricted sale in the general commercial market. U.S. Pat. No. 3,401,143 illustrates compositions of this type and in order to prolong the spreadability of the reaction mixture of the patent a special treatment was employed which involved heating the diamine reactant in a ketone. The patent contains no indication of the extent to which the storage stability of the compositions may have been improved in this manner. Another path for obtaining improved storage stability of the solvent solutions is to employ the strong or highly polar solvents as noted above, but such use results in unwanted expense and products of low solvent evaporation rates.

Another approach for producing polyurea-urethanes of good non-yellowing characteristics and other desirable properties, is to use an alicyclic diamine other than $H_{12}MDA$ as a reactant. Generally, this attack on the problem has not been successful since the resulting polyurea-urethanes show poor resistance to chemicals or provide product solutions of poor storage stability when solvents other than those of the highest polar characteristics are employed.

The present invention avoids the foregoing problems by making the polyurea-urethanes through reaction of isocyanate-terminated prepolymers of $H_{12}MDI$ and polyester polyols with a plurality of diamines, one of which is $H_{12}MDA$ and the other being one or more diamines having a single alicyclic ring. The resulting polyurea-urethanes exhibit good storage stability in solvents which are relatively inexpensive and have adequate evaporation rates, for instance, solvents having a lower alkoxyethanol as a substantial proportion, to make the compositions especially suitable for forming films such as coatings supported on a solid substrate and unsupported films. These films have outstanding properties including good durability, high resistance to solvents, and good color retention when exposed to ultraviolet light, and coatings comprised of such films adhere firmly to various solid substrates. The films when elastomeric exhibit good tensile strength and elongation characteristics.

The isocyanate-terminated prepolymers employed in forming the polyurea-urethanes of this invention are made by reacting a stoichiometric excess of a polyisocyanate component with a polyol material. Generally the ratio of total isocyanate groups to total hydroxyl groups in the reactants used to make the prepolymer is at least 1.2 to 1. often up about 3:1 or more. The prepolymers can have a free isocyanate group content of about 1 to 15, often at least about 2 and preferably about 3 to 7, weight percent based on polymer content or solids. The prepolymer can be formed either in the presence or absence of a liquid solvent for the reactants and products, and, in any event, is subsequently reacted with an essentially stoichiometric amount based on the free isocyanate group content of the prepolymer, of polyamine to form the polyurea-urethane. In this latter reaction either the prepolymer or polyamine component can be in slight excess if desired. The reaction between the prepolymer and the polyamine component is performed in the presence of a liqiud solvent for the polyurea-urethane product, and the solvent component may be supplied at least in part by the solvent used in making the prepolymer, if indeed any were employed. All or any additional part of the solvent can be incorporated in the polyurea-urethane-forming system along with or separately from any of the reactants. The resulting polyurea-urethanes are in essence competely soluble in lower alkoxyalkanol containing solvents which have less than the highly polar characteristics exhibited by strong solvents such as dimethyl formamide, dimetyl sulfoxide and N-methyl pyrrolidone. The solvent solutions of the polyurea-urethanes are essentially clear or transparent in the absence of pigments or other added solid materials, and exhibit storage stability suitable for their being marketed as such on a commercial scale, even to non-industrial users, that is, have a storage stability of at least about 6 months, preferably at least about one year.

As previously stated, the essential isocyanate component used in making the prepolymers employed in this invention is $H_{12}MDI$ although minor amounts of other polyisocyanates may be present in the prepolymer-forming reaction mixture providing no undue deleterious result is obtained. The essential polyol reactant serving to form the prepolymer is a polyester polyol even though minor amounts of other polyols, especially aliphatic polyols, may be present in the reaction mixture providing their presence is not unduly detrimental to the storage stability or the other desired physical and chemical characteristics of the polyurea-urethanes. The hydroxy-terminated polyester materials are generally made by reaction of an excess of one or more polyhydroxy alcohol materials, such as the aliphatic diols, with one or more aliphatic, including cycloaliphatic, or aromatic dicarboxylic acids or their alkyl esters, and such polyesters can often have hydroxyl values in the range of about 25 to 250. The average molecular weight of the polyesters is often about 450 to 4500, preferably about 600 to 3500. In making these polyesters, the essential polyhydroxy alcohol materials are diols and the essential acids are dicarboxylic acids, including their anhydrides or lower alkyl esters, and preferably contain from about 4 to 12 or even 50 carbon atoms, e.g., phthalic acid, adipic acid, sebacic acid, dimers of olefinically-unsaturated monocarboxylic acids, such as linoleic acid dimer, and the like. Polyhydroxy alcohols and carboxylic acids having a functionality of more than two may be used in small amounts in making the polyester polyol. Preferably, the polyesters have a hydroxy functionality of approximately 2.

Among the diols which can be used to make the polyester polyols are those represented by the formula:

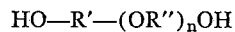

in which R' is an aliphatic hydrocarbon radical, preferably saturated and R'' is an alkylene radical of 2 to 4, preferably 2 to 3, carbon atoms, R' preferably has 2 to about 12, advantageously 2 to about 6, carbon atoms. The letter $n$ represents a number from 0 to about 10. Preferably the letter $n$ is 0 to 2 and the diol contains 2 to about 8 carbon atoms. Exemplary polyols are ethylene glycol, triethylene glycol, hexanediols, diethylene glycol, butane-diols, propanediols, and the like.

The diamine $H_{12}MDA$ is one of the essential polyamines employed in forming the polyurea-urethanes of this invention and this diamine is at least about 20 to 80 weight percent, preferably about 25 to 75 or even about 45 to 75 weight percent, of the total diamine reactants. The other essential diamine is one or more monocyclic, alicyclic diamines having 5 to 8 or even 10, preferably 6, carbon atoms in a single ring. The monocyclic diamine may be further substituted, especially with alkyl groups, and may often contain from 5 to about 16 carbon atoms, preferably from 7 to 12 carbon atoms. The amino groups of the monocyclic, alicyclic diamine reactants may be positioned either on the alicyclic ring or a side chain. These diamines thus include those where one amine group is on the ring and another amine group is on a side chain or both amino groups are on the ring or side chains. Preferably the monocyclic diamine is saturated. Exemplary of the monocyclic diamines are 1,4-bis(aminomethyl)cyclohexane; cycloheptane diamines; hexahydrotoluenediamine, e.g., 1 - methyl - 2,4-diamino-cyclohexane; cyclopentane diamines; 1,8 - diamino-menthane; 1 - amino - 3 - aminomethyl - 3,5,5-trimethyl cyclohexane, hereinafter referred to as IPDA; cyclooctane diamines and the like. Aside from the foregoing described essential diamines the polyurea-urethanes may also be made from reaction mixtures containing minor amounts of other polyamines providing the desired characteristics of the products are not unduly adversely affected.

The monocyclic, alicyclic diamine component reacted in forming the polyurea-urethanes of this invention is about 20 to 80, preferably about 25 to 75 or even about 25 to 55, weight percent of the total diamine employed, and this amount is also sufficient to give the transparent solutions of this invention in which the solvent component has at least about 30, preferably at least about 50, weight percent of one or more alkoxyalkanols of the formula ROR'OH wherein R is lower alkyl, of, say, 1 to 4, preferably 1 to 2, carbon atoms and R' is alkylene of 2 to 4, preferably 2, carbon atoms. The solutions can have up to about 50 or more weight percent of the polyurea-urethane, often up to about 40 weight percent. The solutions can be quite dilute, for instance, have only about 1 to 5% polyurea-urethane for use, for instance, in spray applications. The solutions are storage stable over the previously indicated periods desired for commercial use and often have viscosities at 25° C. not materially exceeding about 75,000 centipoises, preferably not exceeding about 25,000 centipoises, when measured as a 30 weight percent solution of the polyurea-urethane in 2-methoxyethanol as the solvent. The solvent component of the solutions is also such that if less than at least about 20 weight percent of the diamine reacted in making the polyurea-urethane is the monocyclic, alicyclic diamine component the solution will not be storage stable for the commercial periods indicated herein.

The polyurethane prepolymer reaction products of the present invention can be made by simultaneous reaction of excess diisocyanate with polyol. Alternatively, the diisocyanate can be reacted with part or all of one or more of the polyols prior to the reaction with the remaining portion of these materials. Step-wise mixing of the diisocyanate with the polyols may be used to enhance temperature control. The reaction temperatures for making the urethane prepolymers of the present invention are often in the range of about 40 to 150° C., with about 50 to 130° C. being preferred; and the reaction is preferably continued until there is essentially little, if any, unreacted hydroxyl functionality remaining. Catalysts can be used in forming the prepolymers to accelerate the rate of reaction. Typically the catalysts can be organotin compounds, for example dibutyl tin dilaurate and stannous octoate. Other useful catalysts include tertiary aliphatic and alicyclic amines, such as triethyl amine, triethanol amine, tri-n-butylamine, triethylene diamine, alkyl morpholines and the like. Complex mixtures containing such catalysts in modified form may also be employed.

The prepolymers used in the present invention can be in an essentially liquid state either as the prepolymer itself or dissolved in a solvent. The prepolymers can be prepared in the presence of solvent. The solvent serves to insure that the reactants and products are in the liquid state and the solvent permits better temperature control during the reaction by serving as a heat sink and, if desired, as a refluxing medium. Various solvents including mixtures of such materials, may be employed and among the useful organic solvents are aromatic hydrocarbons, esters, ethers, keto-esters, ketones, glycol-ether-esters, chlorinated hydrocarbons, hydrogenated furans, and the like and mixtures thereof. The solvents are generally volatile materials which will be removed from the composition while it cures, and in such case, there may be no need to remove any portion of the solvent from the reaction product prior to further reaction. The amount of solvent employed may vary widely and large volumes may be uneconomic or give materials with undesirably or inconveniently low viscosity or solids content. Often about 0.01 to 3 weights of solvent, preferably about 0.03 to 1 weight of solvent, per weight of the total isocyanate and polyol in the prepolymer are used. Among the suitable normally liquid solvents are toluene, xylene, ethylbenzene, 2-ethoxyethyl acetate, 1,1,1-trichloroethane, methyl isobutyl ketone, dimethylformamide, dioxane, tetrahydrofuran, etc. and their mixtures, and it is preferred that the solvent not contain more than about 10 carbon atoms per molecule.

In preparing the urea-urethane compositions of this invention, the urethane prepolymer of diisocyanate and polyol polyester, is reacted with the diamines, together or in sequence, in the presence of a solvent for the prepolymer and the resulting urea-urethane, to obtain a solution of the urea-urethane in the solvent. Since the solution has no substantial free isocyanate content the urea-urethane cures to a solid at least primarily through evaporation of the solvent, for instance, after forming the solution as a film, e.g. as a coating or sheet, or other article. The urea-urethane solution can be referred to as a lacquer-type vehicle.

The amounts of the urethane prepolymer and diamines reacted and the reaction conditions are chosen so that substantially all of the isocyanate content of the prepolymer is reacted on a weight basis. Since an essentially stoichiometric amounts of amine reactants is used the free isocyanate content of the urea-urethane is less than about 1 weight percent based on polymer solids, and often this free isocyanate content is less than about 0.5 percent. The urea-urethane-forming reaction can be conducted at ambient temperatures and generally the reaction temperature is in the range of about 10 to 120° C. or more, preferably about 50 to 100° C. The urea-urethane-forming reaction may, if desired, be catalyzed for instance, by the use of catalysts similar to those mentioned above with respect to the urethane prepolymer-forming reaction. When the urea-urethane solution is cured the evaporation of solvent can be facilitated by the application of elevated temperatures. The cured polymer films are essentially noncellular as distinguished from a foam.

Among the solvents which can be in the polyurea-urethane are the various organic solvents such as aromatic hydrocarbons; oxygen-containing hydrocarbons, including esters, ethers, glycol ether esters, glycols, cyclic ethers, ether glycols, ketones and the like; and mixtures thereof. However, the urea-urethane compositions of this invention are especially characterized by being soluble in solvents having a substantial or even major weight of alkoxyalkanol of the formula ROR'OH as previously defined. Such solutions are essentially transparent and storage stable.

The solvent of the urea-urethane solutions may contain compounds similar to those employed in the urethane prepolymer-forming reaction or different solvents may be used in each reaction. Solvents present in the urea-urethane-forming reaction are relatively volatile materials which will be removed from the composition while it cures to solid form. Although the amount of solvent employed during the urea-urethane-forming reaction is conveniently that which will give a solution of application viscosity lesser or greater amounts of solvent can be employed. Often about 1 to 10 weights of solvent per weight of the total polyurea-urethane are used. Specific solvents which can be present in the urea-urethane solutions often have up to about 10 carbon atoms and include those mentioned above with respect to the urethane prepolymer system, with the proper attention being given to the degree of solubility exhibited by the prepolymer and the urea-urethane in a given solvent and the potential for between the solvent and/or the polymer-forming materials.

The urea-urethanes of this invention can be employed in any way desired to take advantage of the characteristics of the products, for instance, the urea-urethanes may be used as coatings, adhesives or laminants or formed into relatively thick unsupported sheets or films. The unsupported film products generally have a thickness of up to about 100 mils or more and often the coating compositions have a thickness of up to about 10 mils. The urea-urethanes can be formed into various materials or articles of greater cross-sectional dimensions, and the solutions can be employed in the various ways known in the art for utilization of these types of materials. The compositions can contain additives to impart special properties such as plasticizers, pigments, fillers, etc., also the solid substrates bearing the coating may be specially-treated materials, including flammable members impregnated with fire-resistant chemicals or coated with a sealant.

The following examples will serve to illustrate the present invention. When needed, the polyol component was initially azeotroped to remove water, and the urethane-prepolymer-forming reaction, as well as that producing the urea-urethane, was conducted under an inert gas atmosphere in the usual manner. Blending of the prepolymer and the diamine component was at room temperature in each of the examples. The percents NCO are reported on the basis of the total weight of the prepolymer composition.

The following examples will serve to illustrate the present invention. In the examples the parts and percentages are by weight unless indicated otherwise.

EXAMPLE I

A mixture of 1812 parts 4,4'-bis(isocyanatocyclohexyl)methane and 4232 parts of an ethylene propylene adipate copolyester, having a hydroxyl value of 91 and a molecular weight of about 1230 was heated at about 80° C. under strict anhydrous conditions until the NCO content of the reaction product became constant. An NCO-terminated prepolymer was obtained having an isocyanate content of about 4.6% and a viscosity of about 2400 centipoises.

EXAMPLE II

About 210 parts of the prepolymer prepared in Example I was dissolved in about 90 parts of a 50/50 mixture of tetrahydrofuran and Cellosolve (trademark) acetate. The prepolymer solution was treated with rapid stirring with a solution of about 21 parts of 4,4'-bis(aminocyclohexyl)methane (hereinafter referred to as $H_{12}MDA$) in about 429 parts methyl Cellosolve. A highly viscous solution was obtained immediately which gelled on standing for a few hours at room temperature.

EXAMPLE III

About 300 parts of the prepolymer solution described in Example II above was treated with rapid stirring with a solution of 14 parts of 1,4-bis(aminomethyl)cyclohexane (hereinafter referred to as BAMCH) in about 412 parts methyl Cellosolve. The reaction mixture had a viscosity of about 1500 centipoises. About 70 parts of this mixture was evaporated to dryness in Teflon coated 8" x 8" tray to produce a self-supporting film having a tensile strength of about 500 p.s.i. and a tear strength of about 70 p.l.i. The film had excellent resistance to perchloroethylene (hereinafter referred to as PCE), gasoline and petroleum lubricating oil. The film was swelled by xylene and very severely attacked by isopropyl alcohol (hereinafter referred to as IPA) and ethyl acetate (hereinafter referred to as EtOAc). The viscosity of the reaction mixture increased on storage and the mixture eventually gelled in about 3 weeks so that its poor storage stability would not meet commercial storage and handling requirements which would be at least about 6 months and preferably at least one year or even longer.

EXAMPLES IV–VI

Three polyurethane compositions were prepared as described in Examples II and III above except that the essentially stoichiometric amounts of the individual amines of those examples were replaced by a similar mixture of 4,4'-bis(aminocyclohexyl)methane and 1,4-bis(aminomethyl)cyclohexane. The weight ratio of the amine mixtures, the physical properties of the mixtures and the properties of the unsupported films derived from the prepared polyurethane compositions are summarized in Table I below. From the table it can be seen that polyurethane compositions prepared using the diamine mixtures are stable for prolonged periods. In addition it is seen that the mechanical properties of the unsupported films derived from such compositions are either at least as good as or better than those of the films derived from the compositions prepared using the individual diamines of the mixture. All of the compositions made from the mixed amines produced coatings of excellent resistance to PCE, gasoline and petroleum lubricating oil (motor oil).

TABLE I

| Example number | Comp. of diamine mixture, wt. percent | NV, wt. percent | Visc. (cps.) | Tensile strength, p.s.i. | Tear strength, p.l.i. | Shelf life |
|---|---|---|---|---|---|---|
| IV | H₁₂MDA, 75, BAMCH, 25 | 28.5 | 28.3 | 700 | 120 | Over 1 year. |
| V | H₁₂MDA, 50, BAMCH, 50 | 28.8 | 30.8 | 750 | 130 | Do. |
| VI | H₁₂MDA, 25, BAMCH, 75 | 28.6 | 19.8 | 700 | 75 | Do. |

EXAMPLE VII

The process of Example II is repeated using 13 parts of hexahydrotoluenediamine composed of about 80% 1-methyl-2,4-diaminocyclohexane and 20% 1-methyl-2,6-diaminocyclohexane, (hereinafter referred to as HTDA) in place of 21 parts of 4,4'-bis(aminocyclohexyl)methane. The reaction mixture gelled in a few hours and could not be converted into self-supporting films for evaluation.

EXAMPLE VIII

The process of Example VII was repeated except that the hexahydrotoluenediamine was replaced by 16.4 parts of a mixture containing 60 parts of HTDA and 40 parts 4,4' - bis(aminocyclohexyl)methane by weight. The properties of unsupported films made from the composition are given in Table II, below.

EXAMPLE IX

The process of Example VII was repeated except that the HTDA was replaced by 15.1 parts of a mixture containing 40 parts of HTDA and 60 parts 4,4-bis(aminocyclohexyl)methane by weight. The properties of films derived from this composition are also set forth in Table II.

EXAMPLE X

The process of Example VII was repeated except that the HTDA was replaced by 15.9 parts of a mixture containing about 50 parts of each of HTDA and 4,4'-bis (aminocyclohexyl)methane by weight. Films prepared from this composition exhibited excellent resistance to PCE, gasoline and petroleum lubricating oil and the composition had good shelf life. The properties of unsupported films made from the composition are given in Table II below.

TABLE II

| Example number | Comp. of diamine mixture, wt. percent | Shelf life | Solvent resistance | | | |
|---|---|---|---|---|---|---|
| | | | PCE | Gasoline | Motor oil | Xylol |
| VIII | HTDA, 60, H₁₂MDA, 40 | Over 1 year | Excellent | Excellent | Excellent | Excellent. |
| IX | HTDA, 40, H₁₂MDA, 60 | do | do | do | do | Do. |
| X | HTDA, 50, H₁₂MDA, 50 | do | do | do | do | Do. |

EXAMPLES XI–XIII

In these examples, the procedure of Example II was used except that diamine H₁₂MDA was replaced with diamine mixtures containing an essentially stoichiometric amount of total H₁₂MDA and 1-amino-3-aminomethyl-3,5,5-trimethyl cyclohexane (hereinafter referred to as IPDA). The properties of films derived from the products are summarized in Table III.

TABLE III

| Example number | Comp. of diamine mixture, wt. percent | | Physical properties | | Solvent resistance | | | |
|---|---|---|---|---|---|---|---|---|
| | H₁₂MDA | IPDA | Tensile strength p.s.i. | Tear strength, p.s.i. | PCE | Xylol | Gasoline | Motor oil |
| XI | 75 | 25 | 1,300 | 170 | Good | Good | Excellent | Excellent. |
| XII | 50 | 50 | 1,350 | 250 | do | do | do | Do. |
| XIII | 25 | 75 | 1,000 | 170 | do | do | do | Do. |

EXAMPLE XIV

A mixture of 1500 parts of a diethylene glycol adipate polyester having a hydroxyl number of about 113 and a molecular weight of about 1000, and 923 parts 4,4'-bis-(isocyanatocyclohexyl)methane was heated at about 90° C. under anhydrous conditions until the isocyanate content of the reaction mixture became constant. The reaction mixture was diluted to about 70% by weight using 500 parts tetrahydrofuran and 500 parts Cellosolve acetate to facilitate handling of the viscous prepolymer. The prepolymer solution had an isocyanate content of about 4.5% by weight.

EXAMPLES XV–XVII

In the following examples 300 parts of the prepolymer solution of Example XIV was treated with an equivalent amount (based on NCO) of the H₁₂MDA–IPDA diamine mixtures listed in Table IV. The diamine mixture was added as a solution in sufficient methyl Cellosolve to give a solution containing approximately 30% polymer-urethane. From the table it can be seen that large amounts of the diamine can be composed of H₁₂MDA while still retaining the storage stability of the reaction product, while in Example XV the amount of IPDA was insufficient to give a product of good storage stability.

TABLE IV

| Example number | Comp. of diamine mixture, wt. percent | Physical properties | | Solvent resistance | | | | Shelf-life |
| --- | --- | --- | --- | --- | --- | --- | --- | --- |
| | | Tensile strength, p.s.i. | Tear strength, p.l.i. | PCE | Xylol | Motor oil | Gasoline | |
| XV | H₁₂MDA, 75, IPDA, 25 | | | | | | | 1 day. |
| XVI | H₁₂MDA, 50, IPDA, 50 | 1,300 | 260 | Excellent | Excellent | Excellent | Excellent | 1 year. |
| XVII | H₁₂MDA, 25, IPDA, 75 | 1,000 | 200 | do | do | do | do | Do. |

EXAMPLE XVIII

A prepolymer solution prepared as described in Example II above was treated under rapid stirring with an equivalent amount of a solution of H$_{12}$MDA in ethyl Cellosolve to give a final composition having about 30% polymer solids. The reaction mixture produced an intractable gel which had to be discarded.

EXAMPLE XIX

The process of Example XVIII was repeated substituting a similar amount of butyl Cellosolve for the ethyl Cellosolve solvent. The reaction mixture obtained was again an intractable gel which had to be discarded.

EXAMPLES XX–XXI

The process of Examples XVIII and XIX were repeated substituting a stoichiometric amount of a diamine mixture containing equal amounts of H$_{12}$MDA and IPDA for the H$_{12}$MDA of those examples. The properties of the films derived from these reaction mixtures are listed in Table V.

TABLE V

| Example number | Solvent | Comp. of diamine mixture, wt. percent | Physical properties | | Solvent resistance | | | | Shelf life |
| --- | --- | --- | --- | --- | --- | --- | --- | --- | --- |
| | | | Tensile strength, p.s.i. | Tear strength, p.l.i. | PCE | Xylol | Gasoline | Motor oil | |
| XX | EtOCH₂CH₂OH | H₁₂MDA, 50, IPDA, 50 | 600 | 100 | Excellent | Excellent | Excellent | Excellent | 1 year. |
| XXI | BuOCH₂CH₂OH | H₁₂MDA, 50, IPDA, 50 | 2,500 | 240 | do | do | do | do | Do. |

It is claimed:

1. A urea-urethane composition of an essentially stoichiometric acount of polyamine with an isocyanate-terminated polyurethane prepolymer of 4,4' - bis(isocyanatocyclohexyl)methane and polyester polyol, said polyamine consisting essentially of about 20 to 80 weight percent of 4,4' - bis(aminocyclohexyl)methane and about 20 to 80 weight percent of monocyclic, alicyclic hydrocarbon diamine of 5 to about 16 carbon atoms, 5 to 10 of which form a ring structure.

2. A composition of claim 1 dissolved in a solvent at least 30 weight percent of which is alkoxyalkanol of the formula ROR'OH in which R is lower alkyl and R' is alkylene of 2 to 4 carbon atoms.

3. A composition of claim 2 in which R' is the

—CH$_2$CH$_2$— group and R is methyl, ethyl or butyl.

4. A cured film of the composition of claim 1.

5. A composition of claim 1 in which the monocylic diamine has six carbon atoms in the ring.

6. A composition of claim 5 dissolved in a solvent at least 30 weight percent of which is alkoxyalkanol of the formula ROR'OH in which R is lower alkyl and R' is alkylene of 2 to 4 carbon atoms.

7. A composition of claim 6 in which R' is the

—CH$_2$CH$_2$— group and R is methyl, ethyl or butyl.

8. A cured film of the composition of claim 5.

9. A composition of claim 5 in which said polyamine consists essentially of about 45 to 75 weight percent of 4,4' - bis(aminocyclohexyl)methane and about 25 to 55 weight percent of said monocylic diamine.

10. A composition of claim 9 dissolved in a solvent at least 50 weight percent of which is alkoxyalkanol of the formula ROR'OH in which R is lower alkyl and R' is alkylene of 2 to 4 carbon atoms.

11. A composition of claim 10 in which R' is the

—CH$_2$CH$_2$— group and R is methyl, ethyl or butyl.

12. A cured film of the composition of claim 9.

13. The composition of claim 10 in which said polyester polyol is a polyester of a dicarboxylic acid of about 4 to 12 carbon atoms and an aliphatic glycol of 2 to about 8 carbon atoms and has a hydroxyl functionality of approximately 2.

14. A composition of claim 13 in which R' is the

—CH$_2$CH$_2$— group and R is methyl, ethyl or butyl.

15. A cured film of the composition of claim 13.

16. The composition of claim 13 wherein the monocyclic amine is selected from the group consisting of hexahydrotoluenediamine; 1,4 - bis(aminomethyl)cyclohexane; and 1-amino-3-aminomethyl-3,5,5-trimethylcyclohexane.

17. A composition of claim 16 in which R' is the

—CH$_2$CH$_2$— group and R is methyl, ethyl or butyl.

18. A cured film of the composition of claim 16.

19. The composition of claim 16 wherein the polyester polyol is of adipic acid and glycol selected from the group consisting of ethylene glycol and propylene glycol.

20. A composition of claim 19 in which R' is the

—CH$_2$CH$_2$— group and R is methyl, ethyl or butyl.

21. A cured film of the composition of claim 19.

References Cited

UNITED STATES PATENTS

| 3,401,143 | 9/1968 | Finelli | 260—40 TN |
| 3,507,815 | 4/1970 | Bailey | 260—33.2 R |
| 3,510,456 | 5/1970 | Carr | 260—77.5 AP |
| 3,577,391 | 5/1971 | Argabright | 260—33.4 UR |

MORRIS LIEBMAN, Primary Examiner

P. R. MICHL, Assistant Examiner

U.S. Cl. X.R.

260—30.4 N, 31.2 N, 32.6 NR, 32.8 N, 33.6 UB 33.8 UB, 75 NH